J. W. PACKARD.
VALVE OPERATING MECHANISM FOR MOTOR VEHICLES.
APPLICATION FILED OCT. 13, 1905.
1,050,288.
Patented Jan. 14, 1913.
2 SHEETS—SHEET 1.
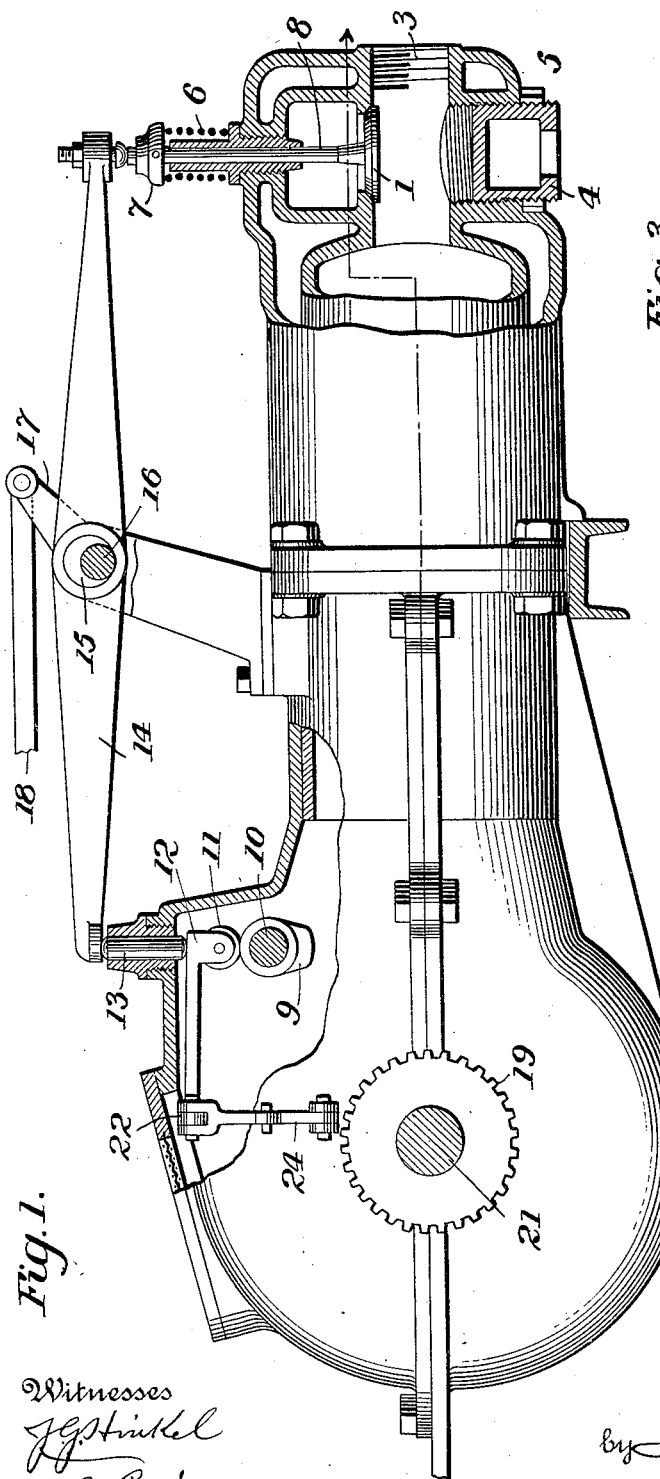
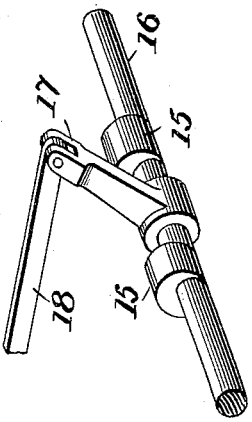
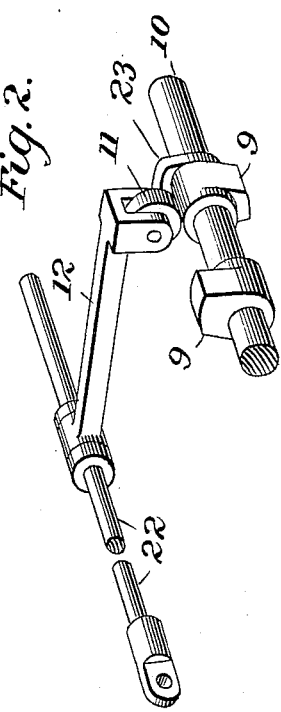
Witnesses
Inventor
James W. Packard
by Foster Freeman Watson
Attorneys

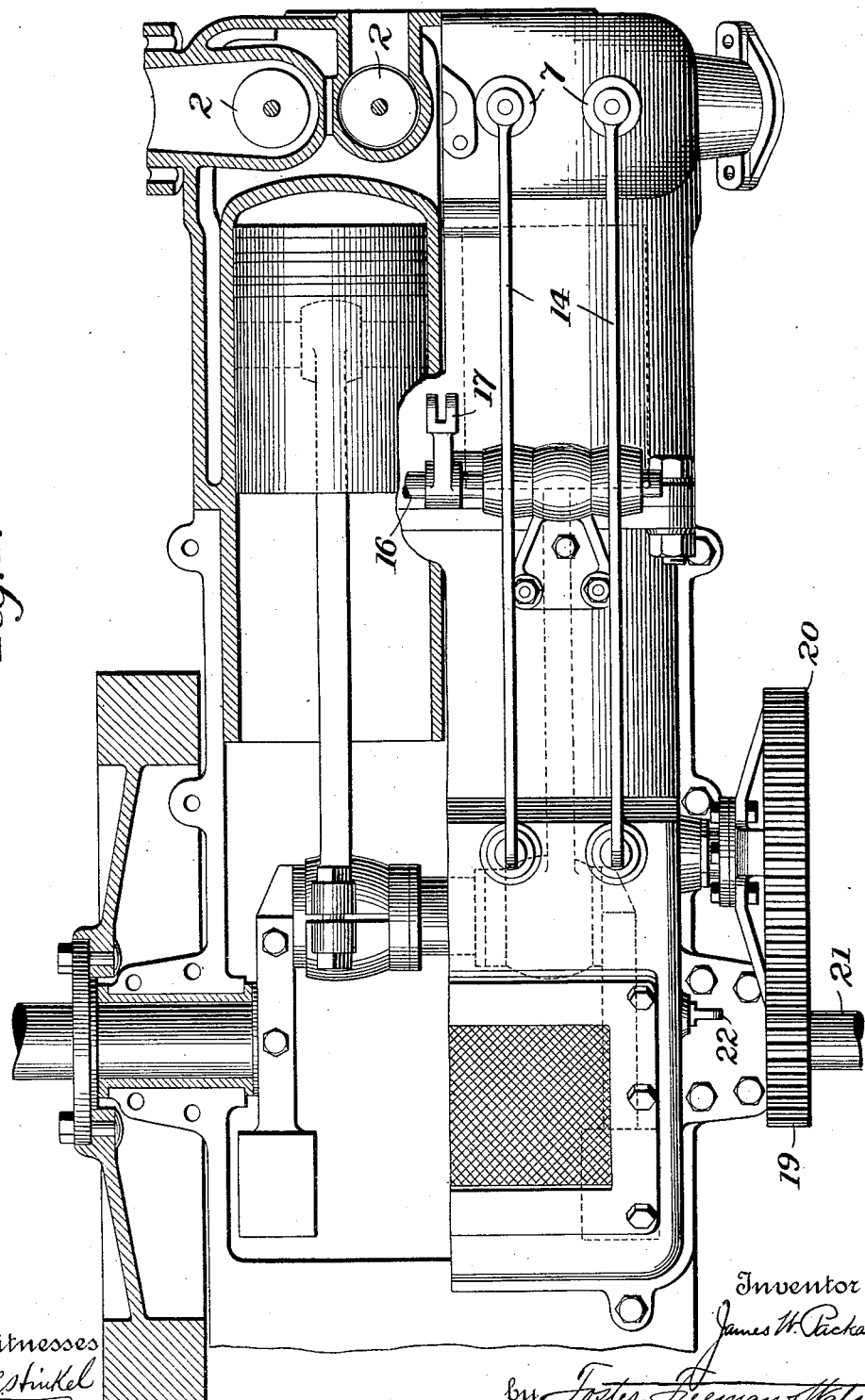

UNITED STATES PATENT OFFICE.

JAMES W. PACKARD, OF WARREN, OHIO, ASSIGNOR, BY MESNE ASSIGNMENTS, TO PACKARD MOTOR CAR COMPANY, OF DETROIT, MICHIGAN, A CORPORATION OF MICHIGAN.

VALVE-OPERATING MECHANISM FOR MOTOR-VEHICLES.

1,050,288. Specification of Letters Patent. Patented Jan. 14, 1913.

Original application filed June 29, 1903, Serial No. 163,589. Divided and this application filed October 13, 1905. Serial No. 282,646.

*To all whom it may concern:*

Be it known that I, JAMES W. PACKARD, a citizen of the United States, and resident of Warren, Trumbull county, State of Ohio, have invented certain new and useful Improvements in Valve-Operating Mechanism for Motor-Vehicles, of which the following is a specification.

The present invention relates to improvements in hydrocarbon engines and particularly to the valve actuating devices and means for controlling the same.

In the drawing, Figure 1 is a side view partly in section of a hydrocarbon engine embodying the invention; Figs. 2 and 3 illustrate details of the engine; Fig. 4 is a plan view partly in section.

The engine illustrated in the drawing is a double cylinder engine having a single crank and each cylinder thereof is provided with an inlet valve 1 and an exhaust valve 2. Said valves are located above the explosion chamber 3 and in the wall of said chamber beneath each valve is a removable plug 4 closing an opening through which the valve may be removed. The plugs 4 are adjustable and checknuts 5 are provided for locking them in any desired position. The object of making the plugs adjustable is to permit of varying the size of the explosion chamber and thereby decreasing or increasing the intensity of the explosion. These adjustable blocks are not claimed in the present case, being made the subject of a separate application, Serial No. 390,971, filed August 31, 1907.

The valves 1, 2, are normally held closed by springs 6 abutting against heads 7 on the valve stems 8 and said valves are positively opened by means of cams 9 9′ on a cam shaft 10, which cams operate through rollers 11, 11′ arms 12, 12′ pins 13 13′ and levers 14, 14′ said levers bearing at one end upon the pins 13 13′ and at the opposite end upon the valve stems 8. In order to vary the degree of opening the inlet valves 1, the levers 14 which operate said valves are mounted on eccentrics 15 carried by a rock shaft 16. The levers 14′ which operate the exhaust valves 2 have bearings concentric with shaft 16. As shown in Figs. 1 and 3, the rock shaft 16 is operated by an arm 17 and a link 18 connecting said arm to any suitable operating lever or governor.

The cam shaft 10 is driven by suitable gearing 19, 20, from the crank shaft 21; and the arms 12 12′ are supported by a rod 22 supported to slide in the engine frame. This sliding movement is intended to permit the cam rolls 11′, which operate the exhaust valves, to ride upon either the aforesaid cams 9′ provided to actuate them, or upon both said cams and cams 23 which are arranged at the side of and are opposite in effect, or substantially so, to said cams 9′. That is, the rollers 11′ controlling the action of the exhaust valves may either be arranged, as shown in Fig. 2, so as to be in the path of the cams 9′ alone, or may be moved laterally so as to be actuated by both the cams 9′ and 23. When it is desired to reduce the charge in the explosion chamber, the rod 22 is moved by a suitable lever 24 so that the rollers 11′ controlling the exhaust valves will travel on both cams 9′ and 23. This adjustment will cause the exhaust valves 2 to open normally during the exhaust stroke of the pistons and then to open again during the compression stroke sufficiently to let a portion of the charge escape through the exhaust passages before ignition takes place. By this means the power and speed of the engine can be regulated either by hand or by the governor, and the starting of the engine facilitated by shifting rolls 11′ so as to be actuated by both cams 9′ and 23.

The governing device for the exhaust valves just described may be used in connection with the aforesaid governing device for the inlet valves, or either may be used singly.

It will be understood that the governing devices above described may be employed in connection with other forms of engines and valves from those shown in the embodiment of the invention illustrated in the accompanying drawing.

The form of engine illustrated is that shown in an earlier application, Serial No. 163,589, of which the present case is a division.

Having thus described the invention what is claimed as new and desired to be secured by Letters Patent is,

1. In a hydrocarbon engine, the combination with the exhaust valve, of a cam for operating said valve to exhaust the burnt gases, and a relatively fixed oppositely disposed cam adapted to open said valve during a portion of the compression stroke, for the purpose set forth.

2. In a hydrocarbon engine, the combination with the cylinder, and the exhaust valve, of a cam shaft provided with two relatively fixed cams, one for operating said valve during the exhaust stroke, and the other for operating said valve during the compression stroke, and means for causing one or both of said cams to operate upon said valve.

3. In a hydrocarbon engine, the combination with a cylinder and the exhaust valve, of a cam shaft provided with two relatively fixed cams, one for operating said valve during the exhaust stroke and the other for operating said valve during a portion of compression stroke, and means shiftable longitudinally of the cam shaft for causing one or both of said cams to operate upon said valve.

4. In a hydrocarbon engine, the combination with a cylinder provided with an exhaust valve, of a cam shaft provided with an exhaust cam and a compression relief cam, mechanism connecting the valve and cams, and means to shift the cams and the valve mechanism relatively to each other to cause one or both of said cams to operate the valve.

5. In a hydrocarbon engine, the combination with a cylinder provided with an exhaust valve, of a cam shaft provided with an exhaust cam and a compression relief cam, a cam roll connected with the valve and adapted to engage the cams, and means to shift the roll and cams relatively to each other longitudinally of the shaft to cause one or both of said cams to operate the valve.

6. In a hydrocarbon engine, the combination with a cylinder provided with an exhaust valve, of a cam shaft provided with a set of relatively fixed cams comprising an exhaust cam and a compression relief cam, mechanism connecting the valve and cams, and means to shift said set of cams and the valve mechanism relatively to each other to cause one or both of said cams to operate the valve.

In testimony whereof I affix my signature in presence of two witnesses.

JAMES W. PACKARD.

Witnesses:
E. A. NELSON,
F. E. PAINE, Jr.